(12) United States Patent
Booth et al.

(10) Patent No.: US 10,843,600 B2
(45) Date of Patent: Nov. 24, 2020

(54) VEHICLE SEAT TRIM COVERS INCLUDING INTEGRALLY-KNIT BACKING MATERIALS AND METHODS OF MANUFACTURING VEHICLE SEAT TRIM COVERS

(71) Applicant: GM Global Technology Operations LLC, Detroit, MI (US)

(72) Inventors: Daniel W. Booth, Troy, MI (US); Paul W. Alexander, Ypsilanti, MI (US); Nancy L. Johnson, Northville, MI (US); Heidi H. Mcadoo-Wilson, Tecumseh (CA); Janet C. Robincheck, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 66 days.

(21) Appl. No.: 16/033,678

(22) Filed: Jul. 12, 2018

(65) Prior Publication Data

US 2020/0017006 A1    Jan. 16, 2020

(51) Int. Cl.
*B60N 2/58* (2006.01)
*B60N 2/90* (2018.01)

(52) U.S. Cl.
CPC ......... *B60N 2/58* (2013.01); *B60N 2/90* (2018.02)

(58) Field of Classification Search
CPC .. B60N 2/58; B60N 2/90; B32B 5/026; B32B 2255/02; B32B 2250/20; B32B 2601/00; D02G 3/446; D02G 3/36; B29C 51/145; D04B 1/22; B29K 2713/00; D10B 2401/041; D10B 2505/12; D10B 2505/08
USPC .................................................... 297/452.58
See application file for complete search history.

(56) References Cited

U.S. PATENT DOCUMENTS

| | | | |
|---|---|---|---|
| 4,558,905 A | 12/1985 | Natori | |
| 4,579,389 A | 4/1986 | Shimbori et al. | |
| 4,718,718 A | 1/1988 | Maruyama | |
| 4,865,383 A | 9/1989 | Sbaragli et al. | |
| 5,308,141 A | 5/1994 | Robinson et al. | |

(Continued)

FOREIGN PATENT DOCUMENTS

JP    2012218612 A    11/2012

OTHER PUBLICATIONS

Booth et al.; U.S. Appl. No. 16/178,006, filed on Nov. 1, 2018 entitled "Knitted Seat Trim Cover With Integral Airbag Pocket"; 52 pages.

(Continued)

*Primary Examiner* — Milton Nelson, Jr.

(57) ABSTRACT

A trim component for attachment to a vehicle seat includes a first portion and a second portion. The first portion is disposed on a first side of the trim component and defines a first knit. The second portion is disposed on a second side of the trim component and defines a second knit distinct from the first knit. The first and second portions are integrally knitted. The trim component is configured to be installed on or more support members of the seat. The first side is configured to face the support member. The second portion is configured communicate with an occupant of the seat. In various aspects, the first portion includes a first yarn and the second portion includes a second yarn that is distinct from the first yarn with respect to one or more of density, thickness, and material. In various aspects, the first yarn is a heat-activated yarn.

13 Claims, 8 Drawing Sheets

(56) References Cited

U.S. PATENT DOCUMENTS

| | | | |
|---|---|---|---|
| 5,326,150 | A | 7/1994 | Robinson et al. |
| 5,338,092 | A | 8/1994 | Wiltsey et al. |
| 5,466,003 | A | 11/1995 | Tanaka et al. |
| 5,678,853 | A | 10/1997 | Maly |
| 5,711,169 | A | 1/1998 | Leeke et al. |
| 5,768,758 | A | 6/1998 | Deignan et al. |
| 5,890,381 | A | 4/1999 | Leeke et al. |
| 5,931,538 | A | 8/1999 | Cayet et al. |
| 6,397,638 | B1 | 6/2002 | Roell |
| 6,401,496 | B1 | 6/2002 | Roell |
| 6,499,801 | B1 | 12/2002 | Peterson et al. |
| 6,641,165 | B2 | 11/2003 | Ohhashi |
| 6,722,742 | B2 | 4/2004 | Potes et al. |
| 6,842,959 | B2 | 1/2005 | Coffield et al. |
| 6,899,399 | B2 | 5/2005 | Ali et al. |
| 6,932,430 | B2 | 8/2005 | Bedford et al. |
| 6,955,402 | B2 | 10/2005 | VanDeRiet et al. |
| 7,017,997 | B2 | 3/2006 | Takezawa et al. |
| 7,028,510 | B1 * | 4/2006 | DaRosa ............... D04B 21/20 66/190 |
| 7,096,549 | B2 | 8/2006 | Coffield |
| 7,132,144 | B2 | 11/2006 | Roberts |
| 7,141,768 | B2 | 11/2006 | Malofsky et al. |
| 7,159,293 | B2 | 1/2007 | Coffield et al. |
| 7,235,504 | B2 | 6/2007 | Shirasaki et al. |
| 7,422,281 | B2 | 9/2008 | Miller |
| 7,422,287 | B2 | 9/2008 | Heidmann et al. |
| 7,588,290 | B2 | 9/2009 | Takezawa |
| 7,607,730 | B2 | 10/2009 | Moseneder |
| 7,669,889 | B1 | 3/2010 | Gorman et al. |
| 7,669,925 | B2 | 3/2010 | Beck et al. |
| 7,677,596 | B2 | 3/2010 | Castro et al. |
| 7,690,723 | B2 | 4/2010 | Evans et al. |
| 7,695,064 | B2 | 4/2010 | Thomas et al. |
| 7,784,819 | B2 | 8/2010 | Lawall et al. |
| 8,176,863 | B2 | 5/2012 | Evans et al. |
| 8,176,868 | B2 | 5/2012 | Han |
| 8,201,880 | B2 | 6/2012 | Kato et al. |
| 8,220,832 | B2 | 7/2012 | Muller |
| 8,398,174 | B2 | 3/2013 | Hofmann |
| 8,474,858 | B2 | 7/2013 | Urabe et al. |
| 8,485,551 | B2 | 7/2013 | Dainese et al. |
| 8,662,583 | B2 | 3/2014 | Guadagno |
| 8,690,256 | B2 | 4/2014 | Hofmann et al. |
| 8,814,267 | B2 | 8/2014 | Welch, Sr. et al. |
| 8,820,780 | B2 | 9/2014 | Thomas |
| 8,845,020 | B2 | 9/2014 | Sei et al. |
| 8,919,878 | B2 | 12/2014 | Sakamoto |
| 8,974,004 | B2 | 3/2015 | Sakamoto |
| 8,991,934 | B2 | 3/2015 | Sei et al. |
| 8,998,339 | B2 | 4/2015 | Peterson et al. |
| 9,055,818 | B2 | 6/2015 | Ludeke et al. |
| 9,061,882 | B2 | 6/2015 | Masuda et al. |
| 9,380,840 | B2 | 7/2016 | Okawa et al. |
| 9,408,467 | B2 | 8/2016 | Peterson et al. |
| 9,462,891 | B2 | 10/2016 | Kikuchi et al. |
| 9,809,137 | B2 | 11/2017 | Kheil |
| 10,532,675 | B2 | 1/2020 | Booth et al. |
| 2002/0002854 | A1 | 1/2002 | Imoto et al. |
| 2002/0117882 | A1 | 8/2002 | Takezawa |
| 2005/0081353 | A1 | 4/2005 | Law |
| 2007/0066197 | A1 | 3/2007 | Woo et al. |
| 2007/0207691 | A1 * | 9/2007 | Cobbett Wiles .......... B32B 5/06 442/318 |
| 2009/0033131 | A1 | 2/2009 | Clauser et al. |
| 2010/0176633 | A1 | 7/2010 | Brncick et al. |
| 2011/0010900 | A1 | 1/2011 | Gilardi et al. |
| 2012/0267937 | A1 | 10/2012 | Sahashi |
| 2012/0306256 | A1 | 12/2012 | Okuyama et al. |
| 2013/0057035 | A1 | 3/2013 | Nishiura et al. |
| 2016/0263857 | A1 * | 9/2016 | Mueller ................ D04B 1/102 |
| 2016/0317047 | A1 | 11/2016 | Sugiyama |
| 2016/0375807 | A1 | 12/2016 | Kageyama et al. |
| 2017/0245602 | A1 | 8/2017 | Nakaya et al. |
| 2018/0105084 | A1 | 4/2018 | Tobata et al. |
| 2019/0023163 | A1 | 1/2019 | Schrey |
| 2019/0031063 | A1 | 1/2019 | Suzuki et al. |
| 2019/0368078 | A1 | 12/2019 | Booth et al. |
| 2020/0017006 | A1 | 1/2020 | Booth et al. |
| 2020/0139920 | A1 | 5/2020 | Booth et al. |

OTHER PUBLICATIONS

Booth et al.; U.S. Appl. No. 15/994,277, filed on May 31, 2018 entitled "Vehicle Seat Trim Cover With Integrally Knitted Attachment Features"; 46 pages.

Booth et al.; U.S. Appl. No. 15/994,345, filed on May 31, 2018 entitled "Vehicle Seat Trim Covers With Knitted Attachment Structures Formed With Heat-Activated Yarns"; 59 pages.

* cited by examiner

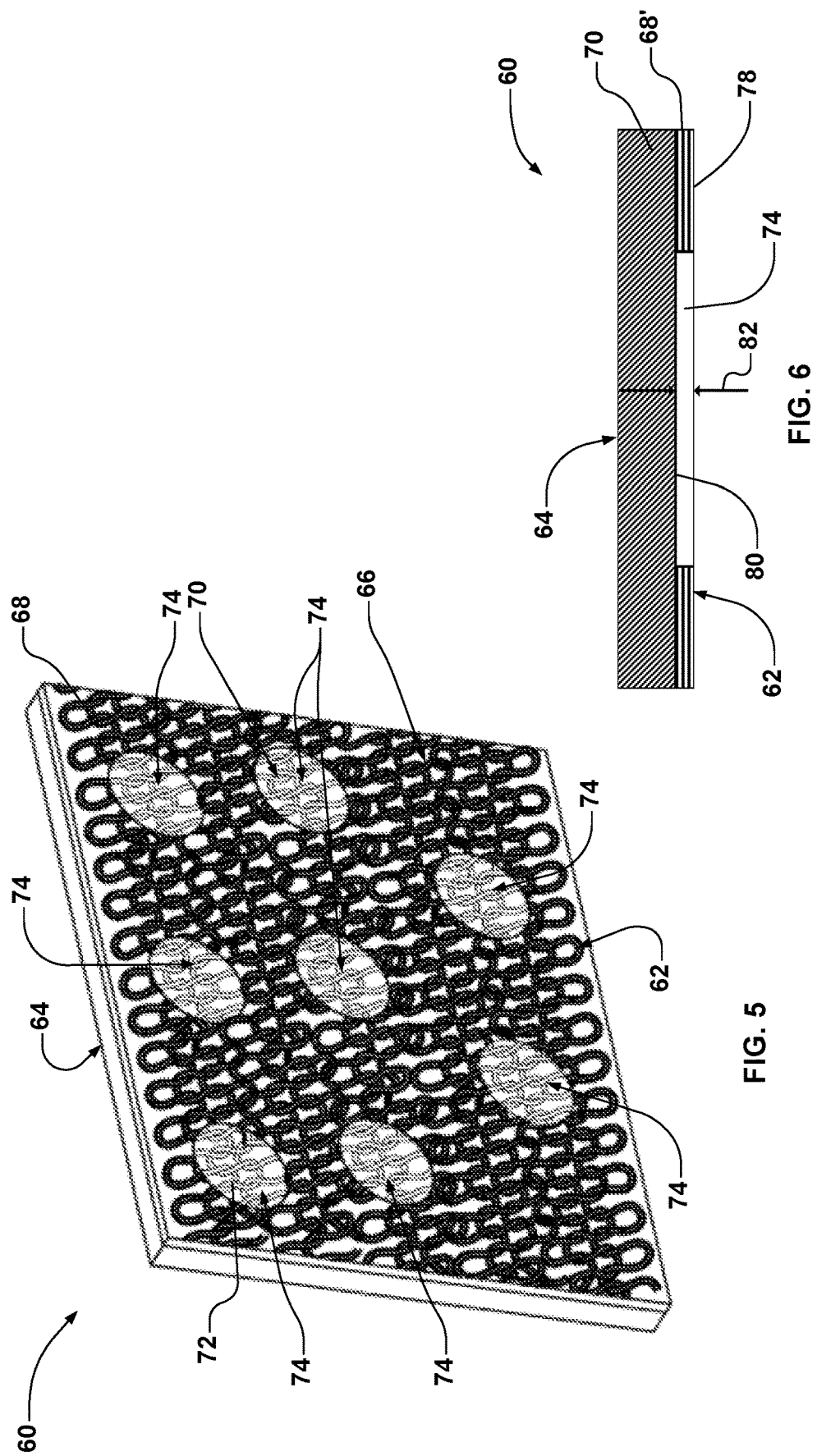

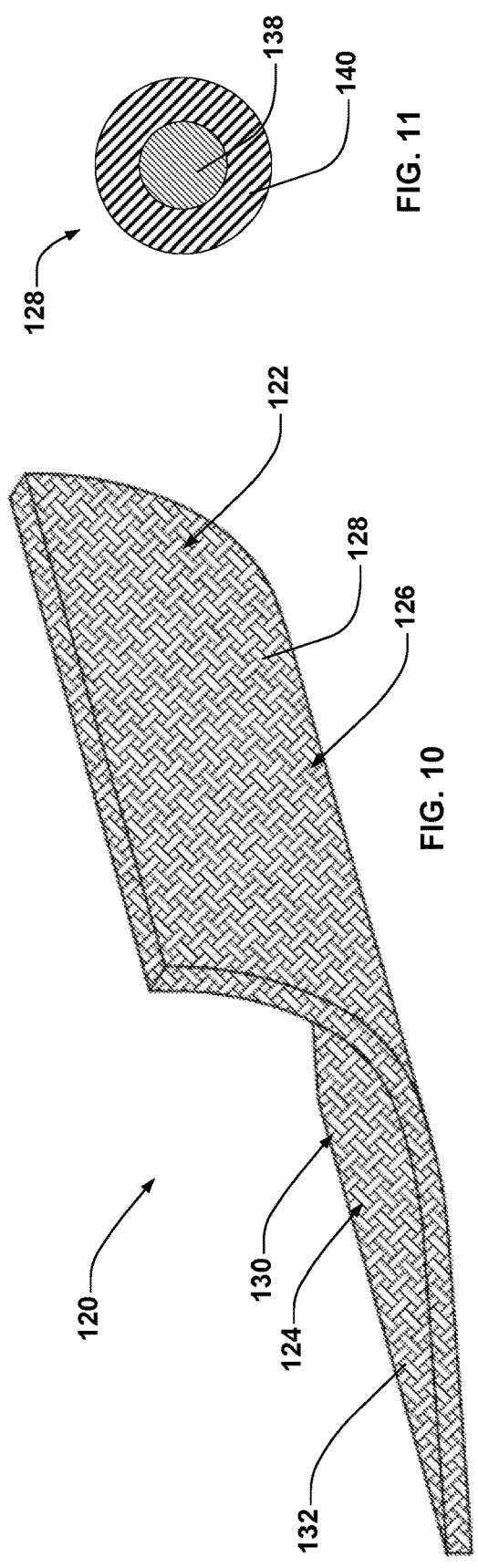

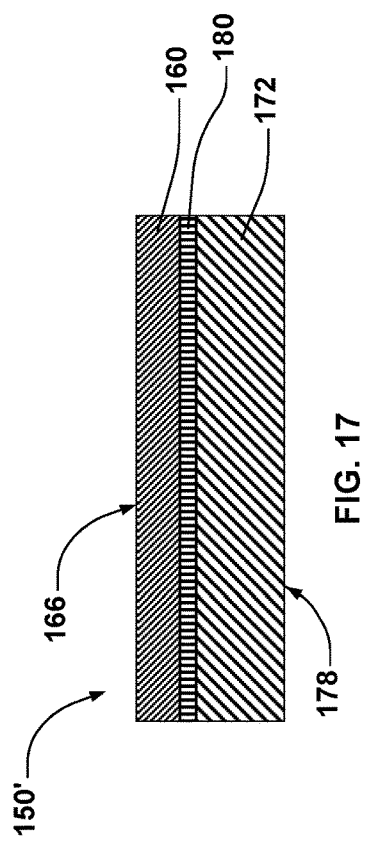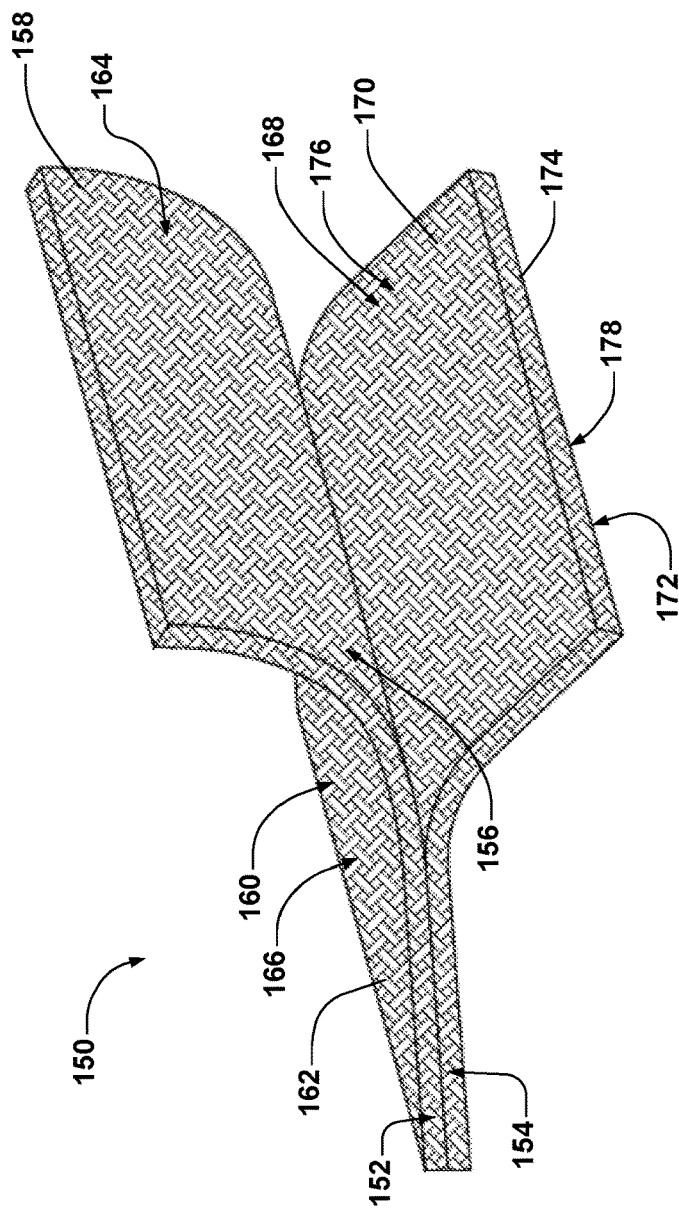

VEHICLE SEAT TRIM COVERS INCLUDING INTEGRALLY-KNIT BACKING MATERIALS AND METHODS OF MANUFACTURING VEHICLE SEAT TRIM COVERS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle seat trim covers that include integrally-knit backing materials and methods of manufacturing the vehicle seat trim covers.

Seat trim covers for vehicle seats can be made of knitted fabrics. Such seat trim covers are installed to cover the internal structure and structural foam of the vehicle seat to result in an aesthetically pleasing and comfortable seating surface. Seat trim covers can include backing materials, such as a scrim, a film, or foam to improve the appearance, durability, performance, or haptics of the vehicle seat.

SUMMARY

In various aspects, the present disclosure provides a trim component for attachment to a seat of a vehicle. The trim component includes a first portion and a second portion. The first portion is disposed on a first side of the trim component. The first portion is knitted. The first portion includes a first yarn. The first yarn is a heat-activated yarn. The second portion is disposed on a second side of the trim component. The second portion is integrally knitted with the first portion. The second portion includes a second yarn. The second yarn is distinct from the first yarn. The trim component is configured to be installed on a support member of the seat. The first side is configured to face the support member. The second portion is configured communicate with an occupant of the seat.

In one aspect, the heat-activated yarn is a bonding yarn configured to stiffen when heat is applied to the bonding yarn.

In one aspect, the bonding yarn includes a thermoplastic polymer selected from the group consisting of: a polyamide, a co-polyamide, a polyester, a co-polyester, and combinations thereof.

In one aspect, the trim component further includes an outer component and an inner component. The outer component includes the first portion and the second portion. The inner component directly engages the first portion. The inner component is configured to engage the support member. The inner component is bonded to the first portion by the bonding yarn.

In one aspect, the first portion defines a plurality of perforations through which the second portion of the trim component is visible from the first side of the trim component.

In one aspect, the heat-activated yarn includes core and a shell at least partially enclosing the core. The core includes a first composition. The shell includes a second composition. The second composition is configured to melt when the heat-activated yarn is heated above a predetermined temperature. The first composition is released from the shell when the second composition melts. The first composition is configured to react with a third composition to form a thermosetting polymer.

In one aspect, the trim component further includes a third portion disposed between the first portion and the second portion. The third portion includes a third yarn. The third portion is integrally knit with the first portion and the second portion. The third yarn includes the third composition.

In one aspect, the trim component further includes an outer component and an inner component. The outer component includes the first portion and the second portion. The inner component includes a third yarn that includes the third composition. The inner component directly engages the first portion of the outer component.

In one aspect, the inner component includes a third portion and a fourth portion. The third portion includes the third yarn and is disposed on a third side of the inner component. The third side engages the first side of the first portion. The fourth portion is disposed on a fourth side of the inner component. The fourth portion is integrally knitted with the third portion and includes a fourth yarn. The fourth yarn is distinct from the third yarn.

In one aspect, one of the first composition and the third composition includes a resin and the other of the first composition and the third composition includes a curative.

In various aspects, the present disclosure provides another trim component for attachment to a seat of a vehicle. The trim component includes a first portion and a second portion. The first portion is disposed on a first side of the trim component. The first portion defines a first knit. The second portion is disposed on a second side of the trim component. The second portion is integrally knitted with the first portion. The second portion defines a second knit distinct from the first knit. The trim component is configured to be installed on or more support members of the seat. The first side is configured to face the support member. The second portion is configured communicate with an occupant of the seat.

In one aspect, the first portion includes a first yarn and the second portion includes a second yarn that is distinct from the first yarn with respect to one or more of density, thickness, and material.

In one aspect, the second portion includes a first region and a second region. The first region includes the second yarn. The second region includes a third yarn distinct from the second yarn and the first yarn.

In one aspect, the second yarn is an air-textured yarn.

In one aspect, the trim component further includes a third portion. The third portion is disposed between the first portion and the second portion. The third portion includes a third yarn and is integrally knit with the first portion and the second portion. The first yarn is a heat-activated yarn.

In one aspect, the first knit and the second knit are distinct with respect to one or more structure, stitch, density, and thickness.

In various aspects, the present disclosure provides a method of assembling a contoured trim component for attachment to a seat of a vehicle. The method includes heating a first material to a first predetermined temperature. The first material includes a heat-activated polymer. The method further includes disposing first material on a forming surface of a fixture. The forming surface defines a plurality of apertures. A first side of the first material is in communication with the forming surface and a second side of the first material is in communication with a second material. The second material is knitted and contoured. The method further includes heating the first material to a second predetermined temperature. The method further includes drawing a vacuum within an internal volume of the fixture. The drawing the vacuum causes the first material to bond to the second material and to conform to the forming surface to form the contoured trim component.

In one aspect, the method further includes, prior to disposing the first material on the forming surface, disposing a third material including foam on the forming surface. The first material is disposed between the third material and the second material.

In one aspect, the first material is knitted with a yarn including the heat-activated material, and the second material is integrally knitted with the first material.

In one aspect, the first material is a sheet including the heat-activated material.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a perspective view of another trim component according to certain aspects of the present disclosure;

FIG. 6 is a sectional view of the trim component of FIG. 5 after heating to form a film;

FIG. 10 is a perspective view of yet another trim component according to certain aspects of the present disclosure;

FIG. 11 is a sectional view of a first yarn of the trim component of FIG. 10;

FIG. 12 is a schematic view of the trim component of FIG. 10;

FIG. 13 is a sectional view of the trim component of FIG. 10 after heating to form a film;

FIG. 14 is a partially-exploded perspective view of yet another trim component according to certain aspects of the present disclosure;

FIG. 17 is a sectional view of the trim component of FIG. 14 after heating to form an adhesive film;

In the drawings, reference numbers may be reused to identify similar and/or identical elements.

DETAILED DESCRIPTION

Figure 1:
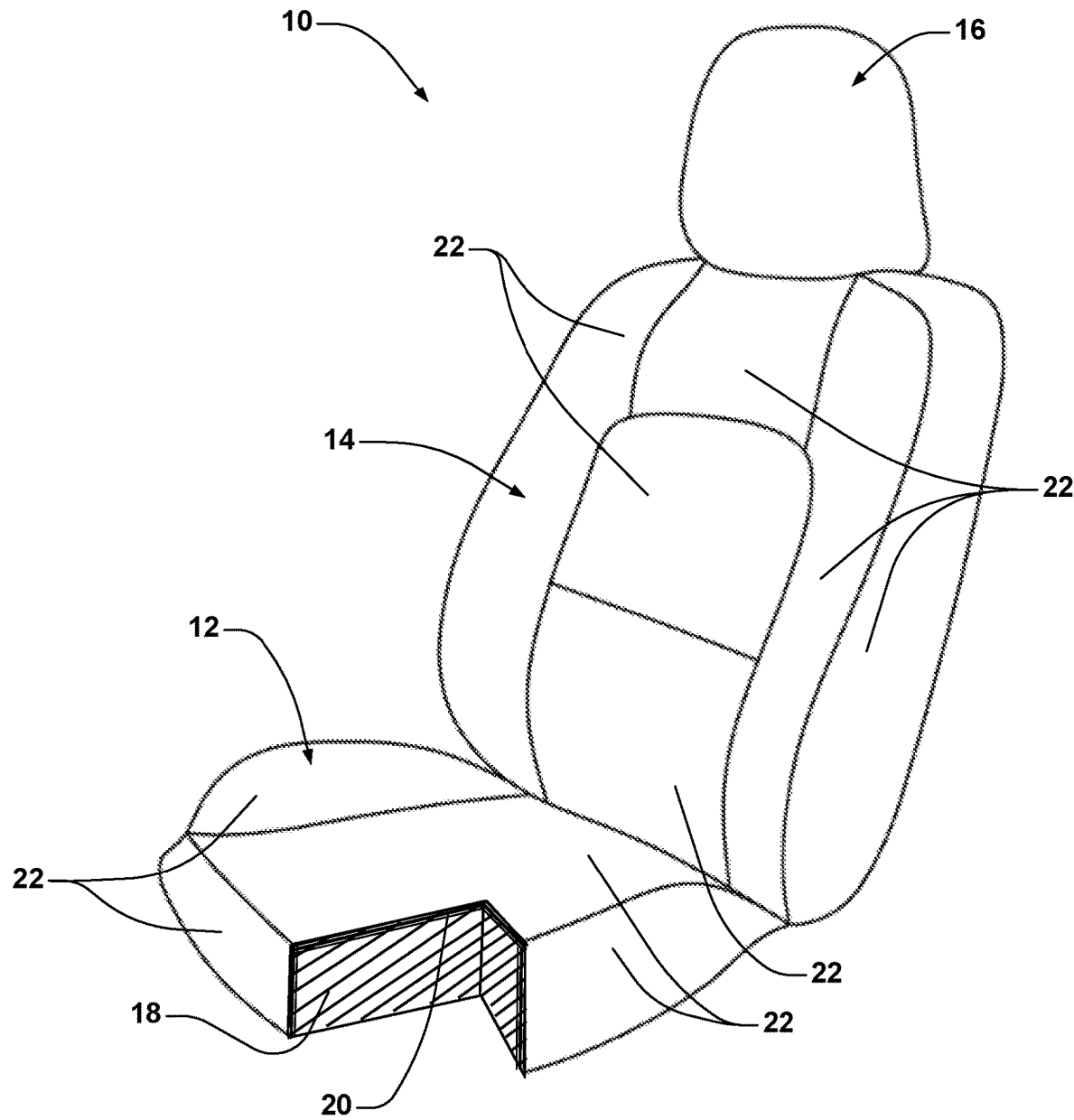
FIG. 1 is a perspective partial sectional view of a vehicle seat according to certain aspects of the present disclosure.

As discussed above, seat trim covers often include backing materials to improve the appearance, durability, performance, and/or haptics of the seat. A portion of the trim cover that faces outward to communicate with an occupant of the seat may be referred to as the "A-side." The A-side may include a knitted material that is durable, stain-resistant, and aesthetically and tactilely pleasing. An inside portion of the trim cover that faces the internal structure of the seat may be referred to as the "B-side." A-side and B-side materials are typically joined together in large flat pieces by sewing, lamination (e.g., flame lamination), or adhesive. The resulting trim materials are large, flat pieces that are disposed on rolls for storage or transport. The materials are subsequently cut into desired shapes and sizes for a particular seat application and joined to one another and/or the seat.

Foam, such as a plus pad, is commonly used as a B-side material. Different regions of the vehicle seat can include foam with distinct characteristics. In one example, a trim panel for a side facing region of the seat includes a thinner foam plus pad and a trim panel for a cushion insert of the seat includes a thicker foam plus pad. In another example, a trim panel having a lower density foam is used on over a seat back insert and a trim panel having a higher density foam is used on the seat cushion insert.

Scrims or films are commonly used as B-side material to protect the support foam of the seat from wear due to frictional engagement with the A-side material. A scrim is a thin, sheet-like material that can be woven or knit. Example scrim materials include light textiles, such as polyester, cotton, and flax. Nonwoven scrims are particularly useful in non-seating applications, such as instrument panels and door inserts. Films include thin polymer-based materials.

A-side materials, are typically provided in large, flat sheets that are joined to the B-side material to produce large, flat sheets of the joined materials. When the A-side material is a knitted material, Three-dimension knitting ("3D knitting") knitting can be used to directly form an A-side material in the desired shape and size. 3D knitting can produce knitted materials having contours, depth, and variable thickness. However, it is difficult to join the B-side material, such as the foam, scrim, or film, to the contoured A-side material because typical joining methods are infeasible or time-intensive. Furthermore, joining a flat B-side material with the contoured A-side material could result in undesirable folds, wrinkles, and/or seams that could decrease occupant comfort, create potential wear spots, and diminish the aesthetic appeal of the seat cover.

In various aspects, the present disclosure provides a trim panel or cover for a vehicle seat including A- and B-sides that are integrally knit with one another. The A-side includes a yarn that has desirable characteristics for interacting with the occupant, such as durability, stain resistance, and/or visual and tactile appeal. The B-side includes one or more yarns that inherently have beneficial characteristics or can be heated to produce beneficial characteristics. Inherent beneficial characteristics include thickness, density, and elasticity, by way of non-limiting example. Certain yarns—referred to as "heat-activated yarns"—can be heated to form a scrim-like surface. Some heat-activated yarns can be heated and used as an adhesive to attach another backing material.

The integrally-knit trim panel can include an A-side that has different textures, colors, or patterns in different regions of the seat. The B-side can be tailored to desired characteristics in each region by varying thicknesses and type of yarn. The B-side can provide protection for the structural foam of the seat, texture sufficient to conceal imperfections in the structural foam, and seat region-specific performance characteristics (e.g., variable density). The integrally-knit trim panels of the present disclosure may therefore increase occupant comfort, improve wear properties of the seat, and enhance the appearance of the seat.

The integrally-knitted trim panel can be contoured and configured to be coupled to the vehicle seat without secondary manufacturing steps such as stitching. Thus, trim panels of the present disclosure require less labor-intensive secondary processing that other trim covers. The trim panels are not limited to use on vehicle seats. The trim panels can also be used, for example, in other vehicle trim components (e.g., dashboards, interior door coverings, storage compartments, steering wheels), or in non-vehicle applications such as furniture, clothing, architectural applications, and other consumer products.

With reference to FIG. 1, a vehicle seat 10 according to certain aspects of the present disclosure is shown. The vehicle seat 10 includes a cushion portion 12, a back portion 14, and a head rest 16. The cushion portion 12 is configured to support an occupant seated on the vehicle seat 10 and the back portion 14 is configured to support the back of the occupant. The seat generally includes an internal structure or frame (not shown), one or more support members 18, and a trim cover 20. One example of the support member 18 is a foam bun.

The trim cover 20 is pulled taut against the support members 18 to prevent the trim cover 20 from wrinkling, bulging, or otherwise separating from the support member 18. The trim cover 20 includes one or more contoured trim panels 22. The trim panels 22 are 3D knitted to have integrally-formed contours. The trim panels 22 may also define integral surface textures, variable thickness, and/or variable density.

Figure 2:
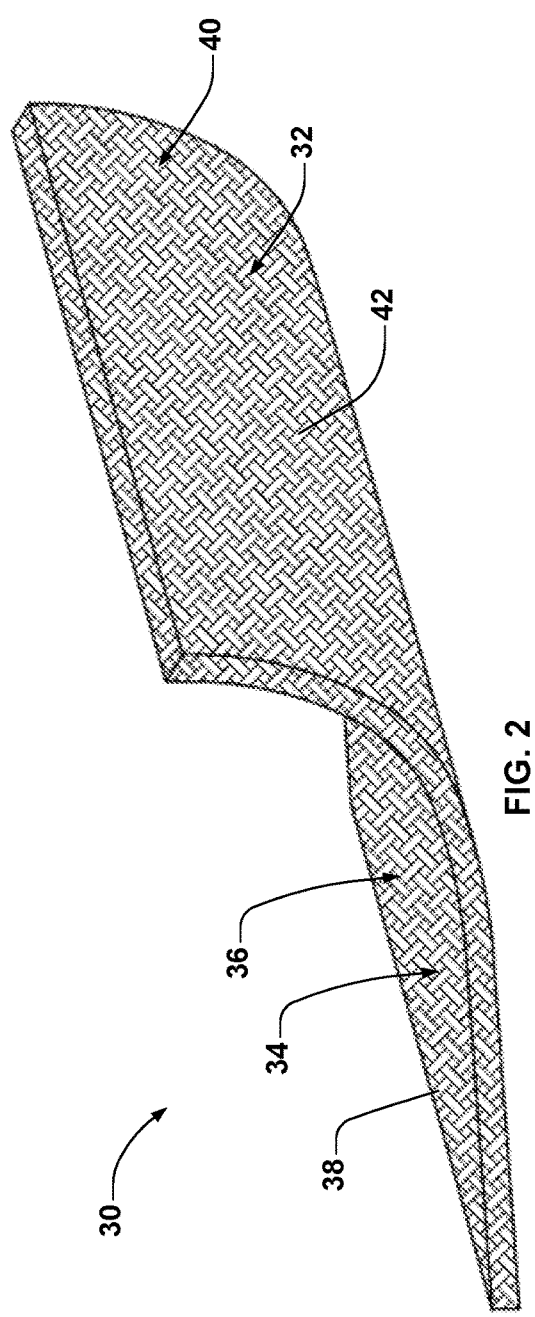
FIG. 2 is a perspective view of a trim component for a vehicle seat according to certain aspects of the present disclosure.
Figure 3:
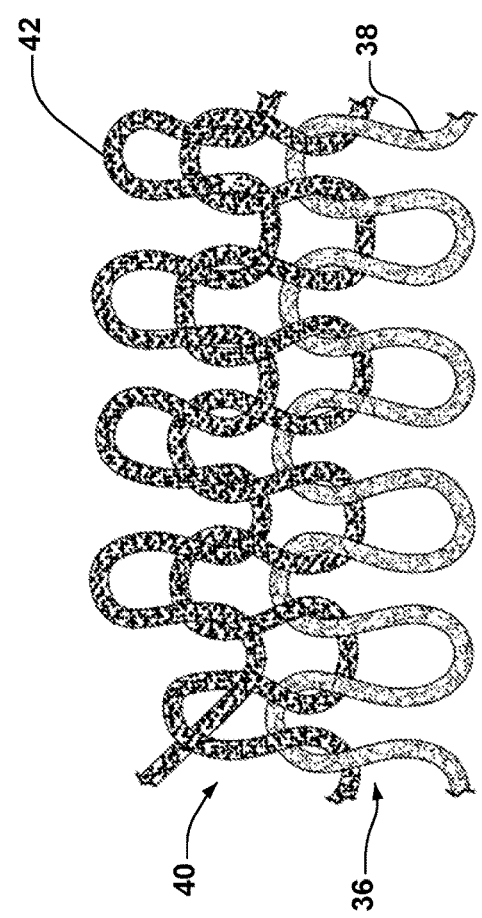
FIG. 3 is a schematic view of the trim component of FIG. 2.
Figure 4:
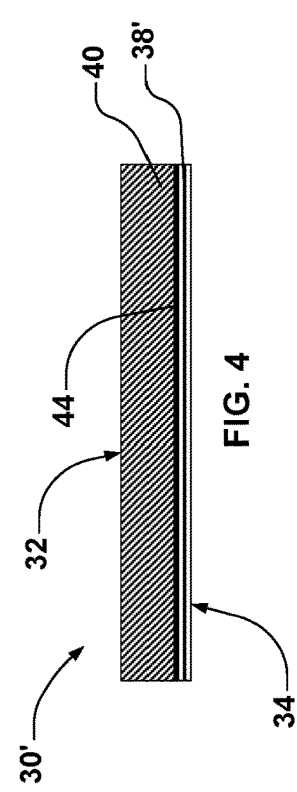
FIG. 4 is a sectional view of the trim component of FIG. 2 after heating to form a film.

Referring to FIGS. 2-4, a trim component 30 for a vehicle seat according to various aspects of the present disclosure is provided. The trim component 30 may be all or a portion of a trim cover (see, e.g., trim cover 20 of FIG. 1). An example of a portion of a trim cover is a panel (see, e.g., trim panels 22 of FIG. 1).

The trim component 30 includes a first side 32 and a second side 34 disposed opposite the first side 32. When the trim component 30 is fixed to the vehicle seat (see, e.g., vehicle seat 10 of FIG. 1), the first side 32 is an underside and is configured to be disposed toward a support member (see, e.g., support member 18 of FIG. 1) of the seat. In certain aspects, the first side 32 directly engages the support member. The second side 34 faces outward and is configured to engage an occupant of the seat.

The first side 32 includes a first knitted portion 36. The first knitted portion 36 is knitted with a first yarn 38. The second side 34 includes a second knitted portion 40. The second knitted portion 40 is knitted with a second yarn 42. The second knitted portion 40 is integrally knitted with the first knitted portion 36, such as by 3D knitting. Thus, the trim component 30 may include integral contours to match contours of the support member of the seat.

The first yarn 38 is a heat-activated yarn. The heat-activated yarn may be a bonding yarn that includes a material that melts at a predetermined temperature and stiffens to fuse to surrounding elements, such as adjacent yarns, fibers, or structures. The bonding yarn may be made up of a plurality of threads. All or a portion of the threads may include a thermoplastic polymer. Examples of suitable thermoplastic polymers include: low-melt polyamides, co-polyamides, low-melt polyesters, co-polyesters, and the like. In various aspects, the thermoplastic polymer is selected from the group consisting of: low-melt polyamides, co-polyamides, low-melt polyesters, co-polyesters, and combinations thereof. Bonding yarns that are formed from thermoplastic threads can be heated and reformed.

The second yarn 42 is distinct from the first yarn 38. Because the occupant of the seat directly engages the second knitted portion 40, the second knitted portion 40 may desirably be durable, stain-resistant, aesthetically-pleasing, and/or tactilely-pleasing. The second yarn 42 may include polyester, polyester blend, polyamide, polyamide blend, wool, or any other suitable yarn known to those skilled in the art. When the second yarn 42 includes a thermoplastic polymer, it has a melting point that is higher than a melting point of the melting point of the first yarn 38.

The second knitted portion 40 is configured to completely conceal the first knitted portion 36 when the trim component 30 is installed on the vehicle seat. The second knitted portion 40 may optionally define variable thicknesses. For example, a first region where direct engagement with the passenger is expected defines a higher thickness and a second region where infrequent engagement with the passenger is expected defines a lower thickness. The knitted portion 40 can also define an integrally-knitted surface texture or pattern to enhance the appearance or feel of the trim component 30. The surface texture or pattern can be present on all or a portion of the seat cover, depending on the desired appearance of the seat. The second side 34 may include other integrally knit yarns (not shown) in addition to the second yarn 42. The yarns may vary based on color, style, density, and/or diameter.

The trim component 30 can be heated to change the trim component 30 from a first configuration shown in FIGS. 2-3, to a second configuration 30' as shown in FIG. 4. More particularly, heat can be applied to the first side 32 of the trim component 30 to melt or soften the polymer of the first yarn 38. Any suitable source of heat can be used to melt the first yarn 38 in the first knitted portion 36. In one example, the trim component 30 is placed inside an oven and subjected to suitable elevated temperatures. In another example, the trim component 30 is heated by flame lamination. In yet other examples, the trim cover 30 is heated using heat guns, steam wands, or other heating devices.

Upon cooling, the polymer of the first yarn 38 is stiffened to form a film 38' on the first side 32 of the trim component 30. In one embodiment, the film 38' is discontinuous. However, in alternative embodiments, the film 38' may be continuous. During heating, the polymer of the first yarn 38 may penetrate void spaces between threads of the second yarn. However, the polymer does leak through to the second side 34 of the trim component 30'. An interface 44 between the first knitted portion 36 and the second knitted portion 40 may be particularly strong due to the combination of the integral knitting and the bonding qualities of the first yarn 38. In certain aspects, only a portion of the first knitted portion 36 is melted (not shown).

In various aspects, the second knitted portion 40 is an A-side of the trim component 30' and the film 38' is a B-side of the trim component. When the trim component 30' is coupled to the vehicle seat, the film 38' is disposed between the second knitted portion 40 and the support member. The film 38' is relatively stiff compared to the second knitted portion 40 and can therefore conceal imperfections in the support member. The film 38' may also be relatively smooth compared to the second knitted portion 40. The smooth texture of the film allows it to slide on the support member without significant chafing, thereby reducing wear at an outer surface of the support member. The reduced wear can advantageously contribute to prolonged life and appearance of the vehicle seat. The trim component 30' is free of a distinct scrim (i.e., a scrim that is attached by secondary processes, such as sewing).

With reference to FIG. 5, another trim component 60 according to various aspects of the present disclosure is provided. The trim component 60 includes a first side 62 and a second side 64 disposed opposite the first side 64. The trim component 60 includes a first knitted portion 66 knitted with a first yarn 68. The first yarn 68 is similar to the first yarn 68 of the trim component 30 (FIGS. 2-4). The trim component 60 further includes a second knitted portion 70 that is knitted with a second yarn 72. The second yarn 72 is similar to the second yarn 42 of the trim component 30 (FIGS. 2-4). The first and second knitted portions 66, 70 are integrally knitted.

The first knitted portion 66 defines plurality of perforations 74. The second knitted portion 70 is visible through the perforations 74 from the first side 64 of the trim component 60. Similar to the trim component 30 of FIGS. 2-4, the first knitted portion 66 can be heated to form a trim component 60' having a film 68' disposed on the first side 62, as shown in FIG. 6. The film 68' extends around a perimeter of the perforations, but does not close off the perforations 74. The perforations 74 permit airflow between the support member (e.g., foam bun) and the second knitted portion 70 (i.e., A-side). In various aspects, the trim component 60' may be referred to as a "perforated trim component."

With continued reference to FIG. 6, the film 68' defines a first surface 78 as viewed from the first side 62 of the trim component 60'. The second knitted portion 70 defines a second surface 80 as viewed from the first side 62 of the trim component 60'. The second surface 80 is offset from the first surface 78 by a depth 82. That is, the perforations 74 have the depth 82. The depth 82 is measured in a direction normal to a surface of the trim component 60'. In various aspects, the depth 82 is greater than 0.5 mm to less than 5 mm, optionally greater than 1 mm to less than 3 mm, and optionally about 2 mm. The depth or offset 82 reduces or eliminates direct contact between the second knitted portion 70 and the support member, which could cause wear of the support member.

Although the perforations 74 are depicted as being circular, one skilled in the art will appreciate that any other shapes that permit sufficient ventilation while minimizing contact between the support member and the second knitted portion 70 are possible. A porosity (total area of perforations 76 divided by total first side 62 surface area) of the trim component 60' may also be changed as long as an area of the first surface 78 is large enough to remain functional as a film/scrim. The perforations 74 need not be evenly distributed across the first side 62 of the trim component 60. For example, a high-contact area, such as adjacent to a seat cushion insert may have a lower porosity while a lower contact area, such as adjacent to a side of the seat, has a higher porosity.

Figure 7:
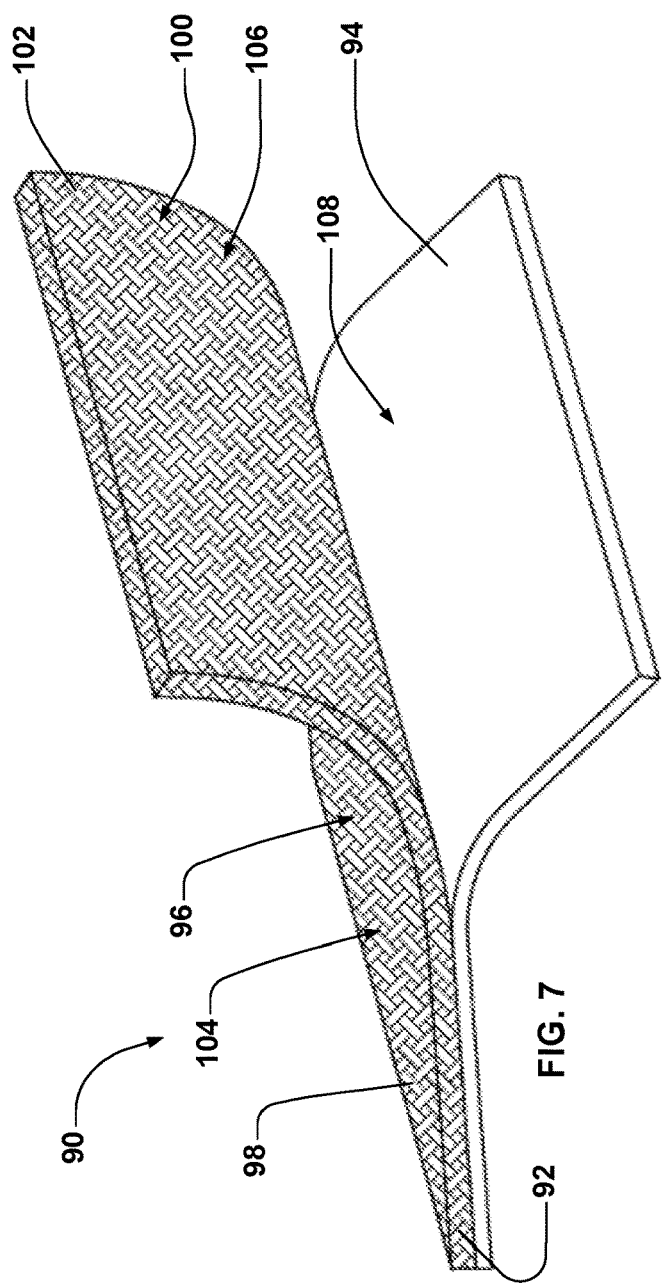
FIG. 7 is a partially-exploded perspective view of yet another trim component according to certain aspects of the present disclosure.
Figure 8:
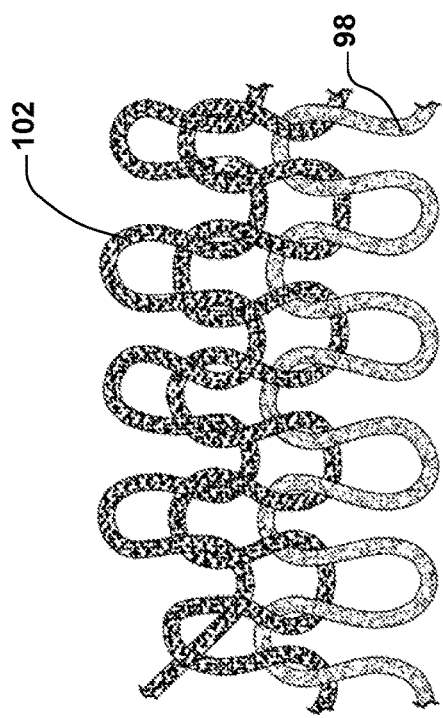
FIG. 8 is a schematic view of the trim component of FIG. 7.
Figure 9:
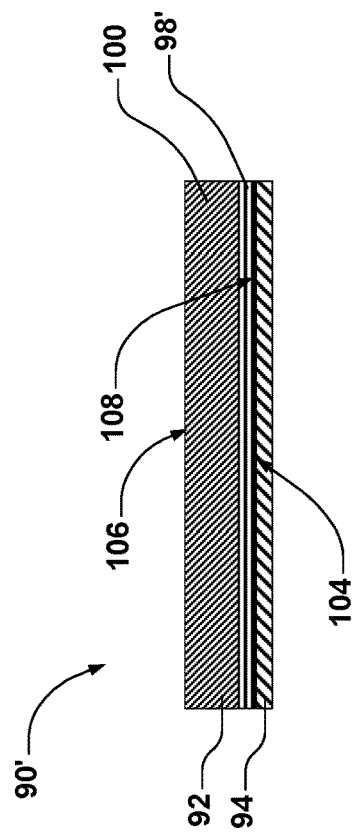
FIG. 9 is a sectional view of the trim component of FIG. 7 after heating to form an adhesive film.
Figure 15:
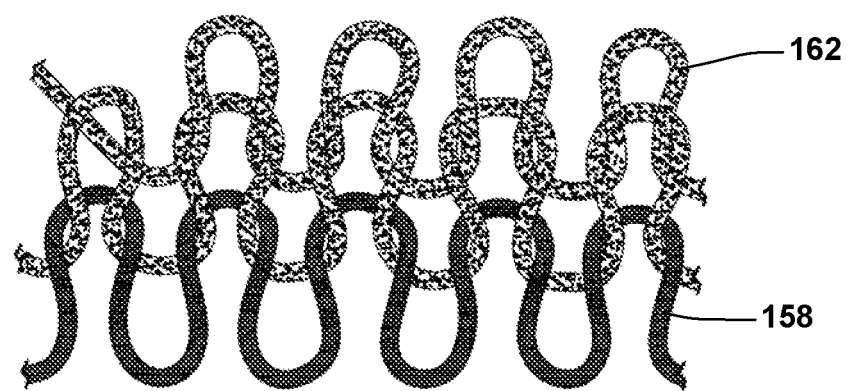
FIG. 15 is a schematic view of an outer component of the trim component of FIG. 14.
Figure 16:
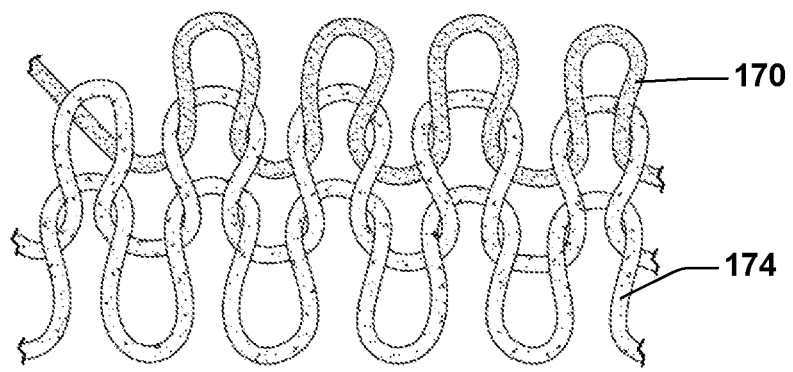
FIG. 16 is a schematic view of an inner component of the trim component of FIG. 14.

With reference to FIGS. 7-9, another trim component 90 according to various aspects of the present disclosure is provided. The trim component 90 includes a first or outer component 92 and a second or inner component 94. The first component 92 is similar to the trim panel 30 of FIGS. 2-4. Therefore, the first component 92 includes a first knitted portion 96 including a first yarn 98 that is a heat-activated yarn, and a second knitted portion 100 including a second yarn 102. The first and second portions 96, 100 are integrally knitted with one another. The outer component 92 may be contoured and formed from a 3D knitting process. The first knitted portion 96 is disposed on a first side 104 of the trim component 90 and the second knitted portion 100 is disposed on a second side 106 of the trim component 90.

The inner component 94 is a scrim. The scrim is a thin material that can be knitted or woven, by way of example. The scrim may be made from or include a light textile, such as polyester, cotton, or flax. The inner component 94 includes a third side 108.

The first or heat-activated yarn 98 is a bonding yarn. Thus, when heated to a predetermined temperature, the first yarn 98 melts. While the first yarn 98 is melted, the third side 108 of the inner component 94 is directly engaged with the first side 104 of the outer component 92. The melted first yarn 98 stiffens and cools to form a film 98' that acts as an adhesive to bond the inner component 94 to the outer component 92, thereby forming a trim component 90'.

As shown in FIG. 9, the film 98' is disposed between the inner component 94 and the outer component 92. The first side 104 of the outer component 92 directly engages the third side 108 of the inner component 94. Similar to the film 38' of the trim component 30' of FIG. 4, the inner component 94 can conceal imperfections in and reduce wear on the support member (see, e.g., support member 18 of FIG. 1) when the trim component 90' is installed on a vehicle seat (see, e.g., vehicle seat 10 of FIG. 1).

With reference to FIGS. 10-13 yet another trim component 120 according to various aspects of the present disclosure is shown. The trim component 120 includes a first side 122 and a second side 124 disposed opposite the first side 122. The trim component 120 includes a first knitted portion 126 that is knitted with a first yarn 128. The first knitted portion 126 is disposed on the first side 122 of the trim component 120. The trim component 120 also includes a second knitted portion 130 that is knitted with a second yarn 132. The second knitted portion 130 is disposed on the second side 124 of the trim component 120. The trim component 120 also includes a third knitted portion 134 that is knitted with a third yarn 136. The first, second, and third knitted portions 126, 130, 134 are integrally knitted with one another. The trim component 120 may include contours.

The second yarn 132 is similar to the second yarn 42 of the trim component 30 (FIGS. 2-4). The first and third yarns 128, 136 are heat-activated yarns. The heat-activated yarns are core-shell yarns that include an elongated core or base and a shell or carrier that at least partially encloses or encapsulates the core. The first yarn 128 includes a first core 138 and a first shell 140 that surrounds the first core 138 (FIG. 11). The first core includes a first composition and the first shell includes a second composition. The third yarn 136 includes a second core (not shown) and a second shell (not shown). The second core includes a third composition and the second shell includes a fourth composition.

The first and third compositions are distinct. More particularly, the first composition is configured to react with the third composition to form a thermosetting polymer. The second and fourth compositions may be the same or different. The second composition is configured to melt when heated to a first predetermined temperature. The fourth composition is configured to melt when heated to a second predetermined temperature. When the second and fourth compositions are heated, first and second shells melt, releasing the first and third compositions of the first and second cores, respectively. In various aspects, the first and second predetermined temperatures are the same or similar so that the first and third compositions are released concurrently during heating. In other aspects, the first and second predetermined temperatures are different so that the first and third compositions are released at different points during heating. The first and third yarns 129, 136 may include any other suitable structures that allow for a controlled release of first and third compositions that form reactive system.

The first composition and the third composition may collectively be a two-part adhesive system. In various aspects, one of the first and third compositions is a resin and the other of the first and third compositions is a curative. In one example, the first composition includes an epoxy resin and the third composition includes a hardener. In another example, the first and third compositions are polyurethane reactants. Examples of suitable second and fourth compositions include polyesters, and nylons.

The respective shells isolate the first and third compositions of the cores until the trim component 90 is heated. When the trim component 90 is heated, the second and fourth compositions at least partially melt to expose the first and third compositions. The first composition and the third composition react to form a thermosetting polymer, thereby forming a trim component 120' having a film 142 that includes the thermosetting polymer.

Similar to the film 38' of the trim component 30' of FIG. 4, the inner component 94 can conceal imperfections in and reduce wear on the support member (see, e.g., support member 18 of FIG. 1) when the trim component 90' is installed on a vehicle seat (see, e.g., vehicle seat 10 of FIG. 1). The use of two different yarns having distinct components that react to form a film allows a large degree of control over where the film 142 is formed on the first side 122 of the trim component 120. In various aspects, the first and/or third knitted portions 126, 134 are knitted to define perforations similar to the perforations 74 of the trim component 60 of FIG. 6. Unlike the thermoplastic polymers described above, the thermosetting polymer of the film 142 cannot be heated and reshaped. Thus, the film 142 may me more permanent than thermoplastic films that can be heated and reshaped.

Referring to FIGS. 14-17, yet another trim component 150 for a vehicle seat according to various aspects of the present disclosure is provided. The trim component 150 includes an outer component 152 and an inner component 154. The outer component 152 is configured to be disposed on the outside of the vehicle seat and the inner component 154 is configured to be disposed toward support member of the vehicle seat (see, e.g., support member 18 of FIG. 1).

The outer component 152 includes a first knitted portion 156 that is knitted with a first yarn 158 and a second knitted portion 160 that is knitted with a second yarn 162. The first and second knitted portions 156, 160 are integrally knitted with one another. The first knitted portion 156 is disposed on a first side 164 of the outer component 152 and the second knitted portion 160 is disposed on a second side 166 of the outer component 152 opposite the first side 164 of the outer component 152.

The inner component 154 includes a third knitted portion 168 that is knitted with a third yarn 170 and a fourth knitted portion 172 that is knitted with a fourth yarn 174. The third and fourth knitted portions 168, 172 are integrally knitted with one another. The third knitted portion 168 is disposed on a third side 176 of the inner component 154. The fourth knitted portion is disposed on a fourth side 178 of the inner component 154 opposite the third side 176 of the inner component 152.

The second yarn 162 is similar to the second yarn 132 of the trim component 120 of FIGS. 10-13. The fourth yarn 174 may be a non-heat-reactive yarn. The fourth yarn may have size or density characteristics that are suited for the inside of a trim cover. For example, the fourth yarn 174 may be a puffy yarn, such as an air-textured yarn, to provide extra padding on the vehicle seat and enhance passenger comfort.

The first yarn 158 is similar to the first yarn 128 of the trim component 120 of FIGS. 10-13. The third yarn 170 is similar to the third yarn 136 of FIGS. 10-13. Therefore, the first yarn 128 includes first and second components, the third yarn 170 includes third and fourth components, and the first and third components are configured to react to form a thermosetting polymer.

The outer and inner components 152, 154 directly engage one another. More particularly, the first side 164 of the outer component 152 is in contact with the third side 176 of the inner component 154. The outer and inner components 152, 154 can be heated to melt the respective second and fourth components and release the first and third components. The first and third components react to form a thermosetting polymer. Thus, a trim component 150' having a film 180 is formed.

The film 180 is disposed between the second knitted portion 160 and the fourth knitted portion 172. The first side 164 may be an A-side of the trim component 150' and the fourth surface 178 may be a B-side of the trim component 150'. As noted above, the fourth knitted portion 172 may include a yarn that is suited for use inside a seat. The fourth yarn 174 may be selected to enhance passenger comfort, such as through use of a puffy or airy yarn that emulates a foam plus pad. Such a yarn may also hide imperfections in the support member, improving an appearance of the vehicle seat.

The trim component 150 is particularly well suited for shipping because the outer component 152 and inner component 154 may be stored separately until they are deliberately joined by heating. As such, the effects of an inadvertent leak of core material is minimized because it would not result in the reaction that forms the thermosetting polymer. Those skilled in the art will appreciate that a trim component of the present disclosure can include more than two components (i.e., the outer component 154 and the inner component 152).

Figure 18:
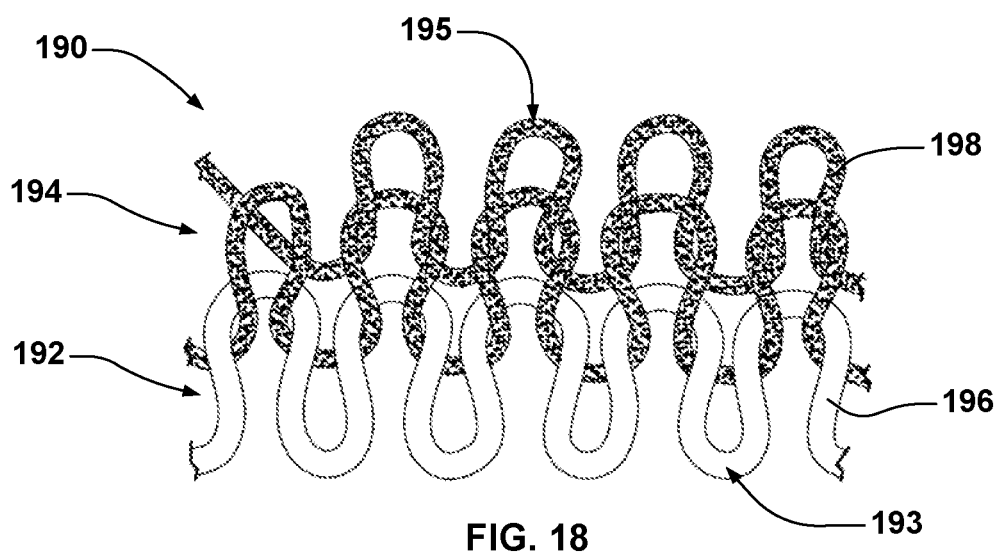
FIG. 18 is a schematic view of yet another trim component according to certain aspects of the present disclosure.

Referring to FIG. 18, a portion 190 of another trim component according to the various aspects of the present disclosure is provided. The trim component 190 includes a first side and a second side opposite the first side. The trim component 190 includes a first knitted portion 192 defining a first knit 193 and a second knitted portion 194 defining a second knit 195 distinct from the first knit 195. The first and second knitted portions 192, 194 are integrally knitted with one another. In various aspects, the first and second knits 193, 195 are distinct with respect to structure, yarn (e.g., yarns having different thicknesses, densities, or materials), stitch, density (e.g., weight of portion/volume of portion), and thickness. In one example, a first portion drops or omits loops to make it soft or airy compared to a second portion (not shown). In another example, a first portion defines a first stitch that is soft or airy and a second portion defines a stitch that is aesthetically pleasing (not shown). In yet another example, first and second portions define the same stitch, the loops of the second portion are pulled tighter than loops of the first portion so that the first portion is more durable and the first portion is more airy (not shown). In yet another example, a first portion is thicker than a second portion to provide a cushion for increased occupant comfort.

In the example shown in FIG. 18, the first knit 193 includes a first yarn 196 and the second knit 195 includes a second yarn 198. The first yarn 196 is similar to fourth yarn 174 of FIGS. 14-17. The second yarn 198 is similar to the first yarn 158 of the trim component 150 of FIGS. 14-17. Therefore, the first knitted portion 192 is configured to form a B-side of the trim component 190 and the second knitted portion 194 is configured to form an A-side of the trim component 190.

The first knitted portion 192 may include a puffy or plush yarn and be knitted to a suitable thickness to function like a plus pad in the vehicle seat. One example of a suitable first yarn 196 is an air-textured yarn. The first knitted portion 192 provides cushioning to enhance occupant comfort. The first knitted portion 192 also protects the support member from chafing by the second knitted portion 194 because the first yarn 196 is softer than the second yarn 198. Finally, the first knitted portion 192 advantageously minimizes the appearance of imperfections in the support member, thereby improving the aesthetics of the vehicle seat. Those skilled in the art will appreciate that the trim component 190 can include additional integrally knit portions, such as a portion including a heat-reactive yarn (not shown).

In various aspects, the first knitted portion includes a plurality of regions having distinct characteristics. In one example the first knitted portion includes a first region and a second region that is integrally knit with the first region. The first and second regions are both disposed on the first side of the trim component. The first region defines a first thickness and the second region defines a second thickness that is distinct from the first thickness. In another example, the first portion includes a first region and a second region. The first and second regions are both disposed on the first side of the trim component. The first region is knitted with the first yarn having a first density. The second region is integrally knitted with a second yarn having a second density. The first and second densities are distinct. In both of the examples above, the different regions may be disposed on different regions of the vehicle seat, such as a cushion that has a greater thickness and/or higher density or a seat side that has a lower thickness/lesser density.

Figure 20:
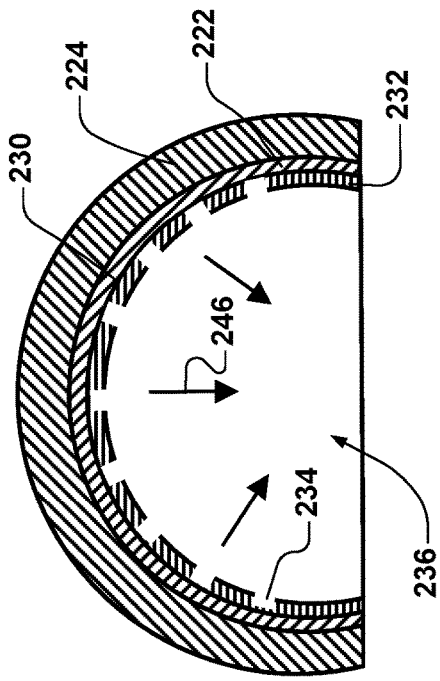
FIG. 20 is an example trim component according to certain aspects of the present disclosure, formed according to the method of FIG. 19.
Figure 21:
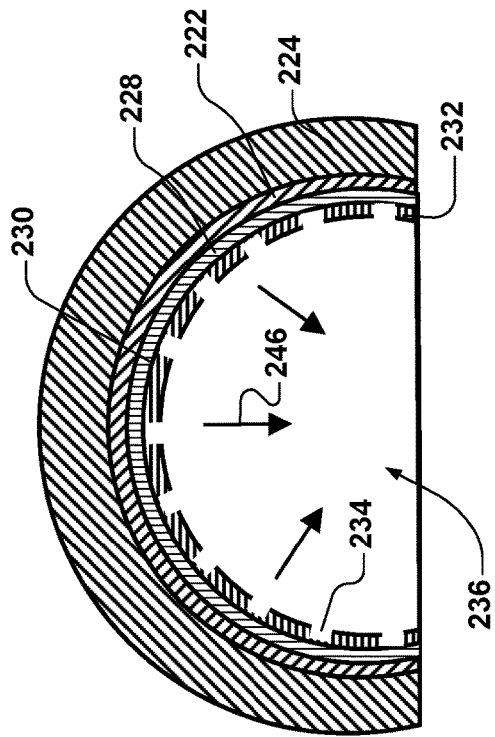
FIG. 21 is another example trim component according to certain aspects of the present disclosure, formed according to the method of FIG. 19.
Figure 19:
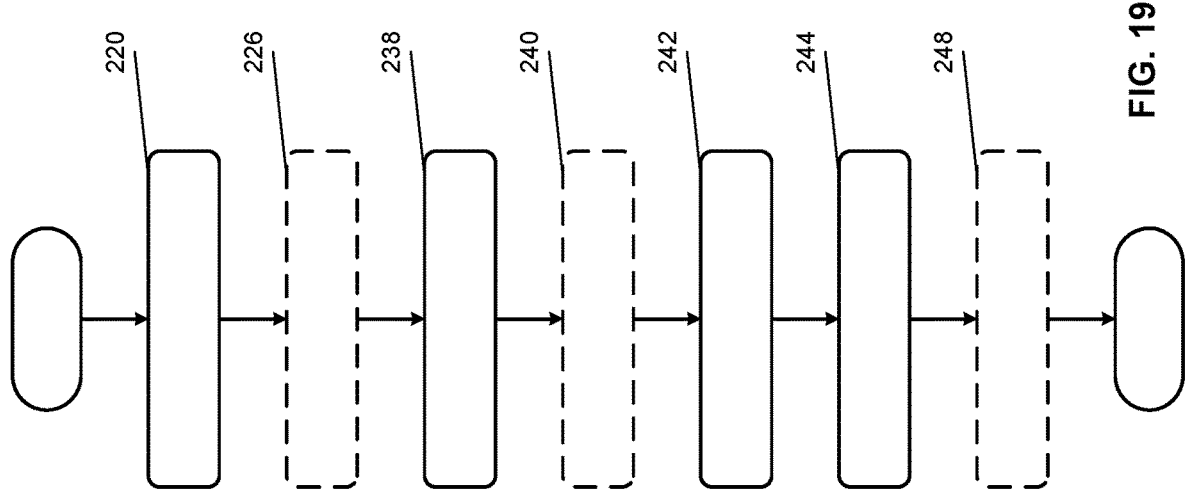
FIG. 19 is a flowchart depicting an example method of thermoforming a contoured trim component.

With reference to FIGS. 19-21, a method of forming a contoured trim component for a vehicle seat according to various aspects of the present disclosure is provided. The method begins at 220. At 220, a first material 222 is heated to a first predetermined temperature. The first material 222 includes a heat-activated polymer, such as those described above. The first material 222 may be in the form of a distinct thin, polymeric sheet. The first material 222 may alternatively be in the form of a first yarn integrally knitted with a second contoured, knitted material 224. The first predetermined temperature may be above a glass transition temperature of the polymer of the polymeric film and below a melting temperature of the polymer. In certain aspects, this step is referred to as a preheating step. The method continues at 226.

At 226, a third material 228 is optionally placed on a forming surface 230 of a fixture 232 (FIG. 21). The forming surface 230 defines a plurality of apertures 334 that are open to an interior volume 236 of the fixture 232. The forming surface 230 is configured to match the contours of a vehicle seat onto which the trim cover will be installed. The third material 228 includes foam, such as those described above. In various alternative aspects, the third material 228 may include a knitted material similar to the fourth knitted portion 172 of the inner component 154 of the trim component 150 of FIGS. 14-17. The third material 228 may be in direct contact with the forming surface 230. The third material 228 may be omitted (FIG. 20). The method continues at 238.

At 238, the first material 222 is disposed on the forming surface 230 of the fixture 232. When the first material 222 is at the first predetermined temperature, at can be stretched around the forming surface 230 to eliminate wrinkles, puckers, and folds. If step 226 is performed, the first material 222 is placed on the third material 228. If step 226 is omitted, the first material 222 is placed in direct contact with the forming surface 230. The method continues at 240.

At 240, the second material 224 is optionally disposed on the first material 222. If the first material 222 is in the form of the thin, polymeric sheet, the second material 224 is a 3D knitted structure having one or more contours. If the first material 222 and the second material 224 are integrally knit with one another (see, e.g., trim component 30 of FIGS. 2-3), step 240 is omitted because the second material 224 is already disposed on the first material 222. The method continues at 242.

At 242, the first material 222 is heated to a second predetermined temperature. The second predetermined temperature is above the glass transition temperature of the polymer and below the melting temperature of the polymer. The second predetermined temperature may be the same or different than the first predetermined temperature. Heating the first material 222 to the second predetermined temperature causes to soften so that it can conform to the forming surface 230 of the mold. The method continues at 244.

At 244, the vacuum 246 is drawn within the internal volume 236 of the fixture 232. The vacuum pressure may be in a range of 20-27 inHg. The method continues at 248. Step 244 and step 242 may be performed concurrently.

At 248, additional pressure is optionally applied to the materials 222, 224, 238 on the fixture 232. Step 248 may be omitted. The method ends. The resulting trim cover is contoured to may contours of the vehicle seat. The trim cover is subsequently installed on the vehicle seat.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to,"

"on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A trim component for attachment to a seat of a vehicle, the trim component comprising:
    a first portion disposed on a first side of the trim component, the first portion being knitted and including a first yarn, the first yarn being a heat-activated yarn, the heat-activated yarn being a bonding yarn configured to stiffen when heat is applied to the bonding yarn; and
    a second portion disposed on a second side of the trim component, the second portion being integrally knitted with the first portion and including a second yarn, the second yarn being distinct from the first yarn, wherein:
    the trim component is configured to be installed on a support member of the seat;
    the first side is configured to face the support member; and
    the second portion is configured to communicate with an occupant of the seat.

2. The trim component of claim 1 wherein the first portion defines a plurality of perforations through which the second portion of the trim component is visible from the first side of the trim component.

3. The trim component of claim 1 wherein the bonding yarn comprises a thermoplastic polymer selected from the group consisting of: a polyamide, a co-polyamide, a polyester, a co-polyester, and combinations thereof.

4. The trim component of claim 1 further comprising:
    an outer component including the first portion and the second portion; and
    an inner component directly engaging the first portion and configured to engage the support member, wherein the inner component is bonded to the first portion by the bonding yarn.

5. The A trim component for attachment to a seat of a vehicle, the trim component comprising:
    a first portion disposed on a first side of the trim component, the first portion being knitted and including a first yarn, the first yarn being a heat-activated yarn; and
    a second portion disposed on a second side of the trim component, the second portion being integrally knitted with the first portion and including a second yarn, the second yarn being distinct from the first yarn, wherein:
    the trim component is configured to be installed on a support member of the seat;
    the first side is configured to face the support member;
    the second portion is configured to communicate with an occupant of the seat;
    the heat-activated yarn includes core and a shell at least partially enclosing the core;
    the core includes a first composition;
    the shell includes a second composition configured to melt when the heat-activated yarn is heated above a predetermined temperature;
    the first composition is released from the shell when the second composition melts; and
    the first composition is configured to react with a third composition to form a thermosetting polymer.

6. The trim component of claim 5 wherein one of the first composition and the third composition includes a resin and the other of the first composition and the third composition includes a curative.

7. The trim component of claim 5 further comprising a third portion disposed between the first portion and the second portion, the third portion including a third yarn and being integrally knit with the first portion and the second portion, wherein the third yarn includes the third composition.

8. The trim component of claim 5 further comprising:
    an outer component including the first portion and the second portion; and
    an inner component including a third yarn that includes the third composition, the inner component directly engaging the first portion of the outer component.

9. The trim component of claim 8 wherein:
    the inner component includes a third portion and a fourth portion;
    the third portion includes the third yarn and is disposed on a third side of the inner component, the third side engaging the first side of the first portion; and
    the fourth portion is disposed on a fourth side of the inner component, the fourth portion being integrally knitted with the third portion and including a fourth yarn, the fourth yarn being distinct from the third yarn.

10. A trim component for attachment to a seat of a vehicle, the trim component comprising:
    a first portion disposed on a first side of the trim component, the first portion defining a first knit and including a first yarn;
    a second portion disposed on a second side of the trim component, the second portion being integrally knitted with the first portion and defining a second knit distinct from the first knit, the second portion including a second yarn that is distinct from the first yarn with respect to one or more of density, thickness, and material; and
    a third portion disposed between the first portion and the second portion, the third portion including a third yarn and being integrally knit with the first portion and the second portion, wherein the first yarn is a heat-activated yarn, wherein:
    the trim component is configured to be installed on one or more support members of the seat;
    the first side is configured to face the support member; and
    the second portion is configured to communicate with an occupant of the seat.

11. The trim component of claim 10 wherein the first knit and the second knit are distinct with respect to one or more of structure, stitch, density, and thickness.

12. The trim component of claim 10 wherein the second yarn is an air-textured yarn.

13. The trim component of claim 10 wherein:
    the second portion includes a first region and a second region;
    the first region includes the second yarn; and
    the second region includes a third yarn distinct from the second yarn and the first yarn.

* * * * *